(No Model.)
J. H. HUMPHREY.
POST HOLE DIGGER.
No. 374,304. Patented Dec. 6, 1887.
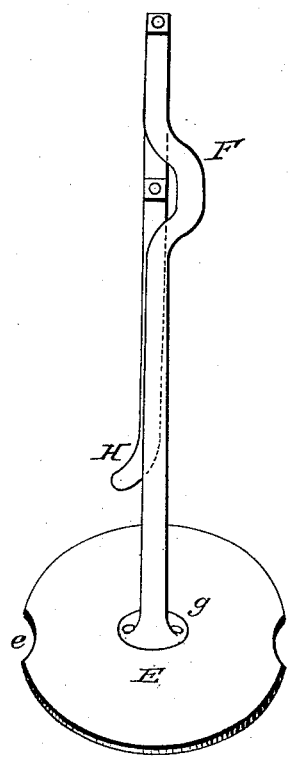
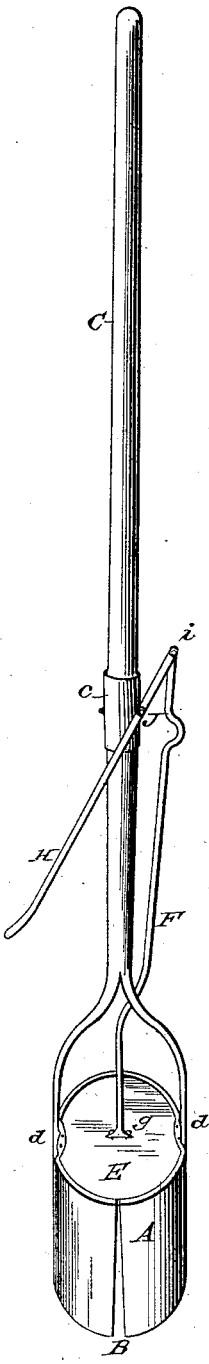
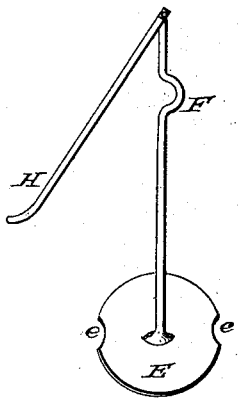
WITNESSES:
Fred G. Dieterich
Chas. R. Wright
INVENTOR:
James H. Humphrey
BY Munn & Co
ATTORNEYS.

UNITED STATES PATENT OFFICE.

JAMES H. HUMPHREY, OF PLATTE CITY, MISSOURI.

POST-HOLE DIGGER.

SPECIFICATION forming part of Letters Patent No. 374,304, dated December 6, 1887.

Application filed August 14, 1886. Serial No. 210,952. (No model.)

*To all whom it may concern:*

Be it known that I, JAMES H. HUMPHREY, a citizen of the United States, residing at Platte City, in the county of Platte and State of Missouri, have invented a new and useful Attachment for Post-Hole Diggers, of which the following is a specification.

My invention relates to that class of post-hole diggers provided with plungers for removing the earth from the cylinder when filled, and also for packing the earth in the said cylinder to retain it therein while being raised out of the hole; and the invention consists in the peculiar construction and arrangement of parts, as hereinafter fully described, and pointed out in the claims.

Figure 1 is a side elevation of my improvement. Figs. 2 and 3 are detail views of the plunger and its operating-lever.

In the accompanying drawings similar letters of reference indicate corresponding parts in all of the figures.

A is an iron cylinder, having the slit B and provided with the handle C, about all of which there is nothing new.

E is a disk of a diameter a little less than that of the cylinder, to permit it to move freely therein. To the disk E is secured the rod F, which is provided near its upper end with the bend $f$, for a purpose hereinafter described.

On the handle C, I secure a sleeve, $c$, and to this sleeve I pivot the handle H, as shown at $j$, and pivot the upper end of the handle to the rod F by means of the bolt $i$.

To allow the air that is below the plunger E to escape, and thereby prevent suction, I notch the opposite sides of the plunger, as shown at $e$.

With a post-hole digger provided with my attachment the earth can be readily packed in the cylinder or discharged therefrom by simply operating the lever H, the plunger descending when the lever is raised and ascending when it is depressed. By means of the bend $f$ in the rod F the pivots $i$ $j$ can be brought into alignment, as shown in Fig. 2, and thereby lock the plunger elevated while the cylinder is being filled.

Having thus described my invention, what I claim, and desire to secure by Letters Patent, is—

1. An attachment for post-hole diggers, consisting of a disk or plunger provided with an upwardly-projecting rod having a bend near its upper end, and a lever pivoted to the said upper end and adapted to be pivoted to the handle of the digger, whereby the plunger is locked in position, substantially as herein shown and described.

2. The combination, with a post-hole digger, of the disk E, having the notches $e$, and provided with the rod F, having the bend $f$, and the lever H, pivoted to the handle of the digger and to the upper end of the rod F, substantially as herein shown and described.

JAMES H. HUMPHREY.

Witnesses:
GEO. A. SPOONER,
JOHN W. CHAPLAIN.